Figure 1:
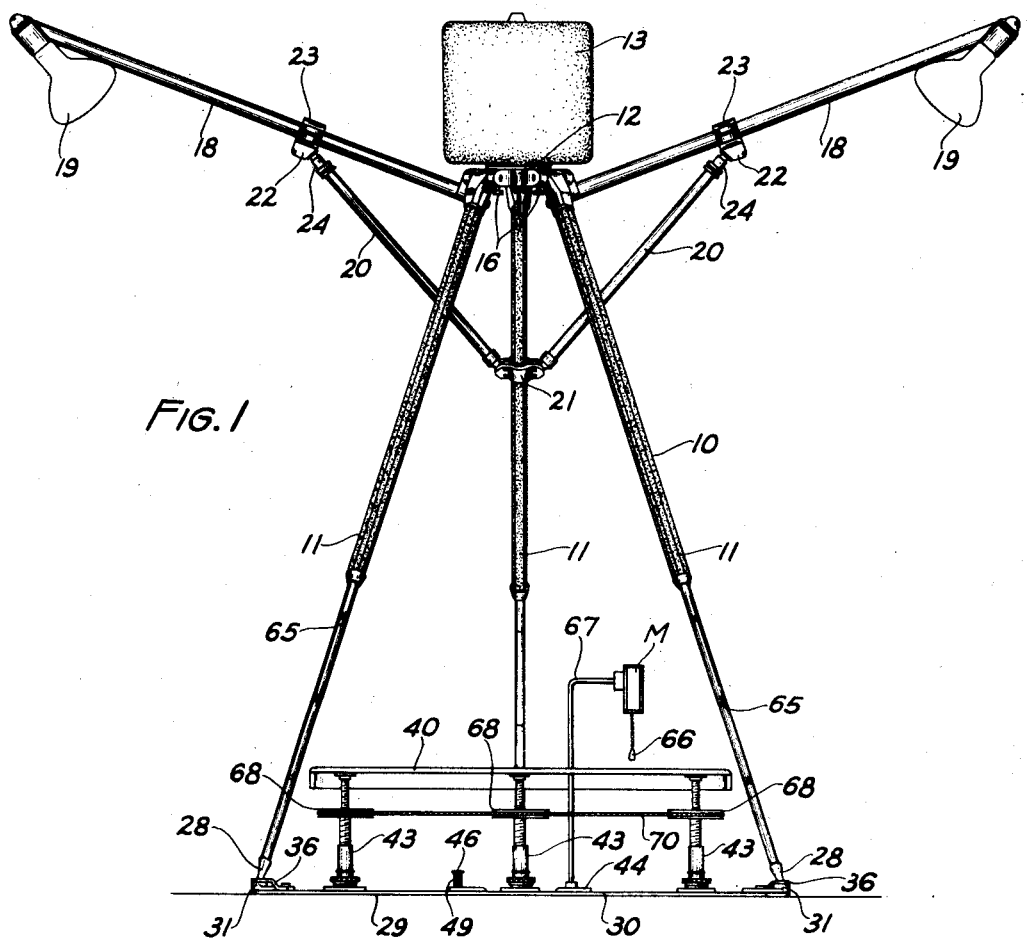

March 10, 1942.  A. E. SCHUBERT  2,275,687
PHOTOGRAPHIC COPYING APPARATUS
Filed Aug. 16, 1940  2 Sheets-Sheet 1

ALVIN E. SCHUBERT
INVENTOR
BY
ATTORNEYS

March 10, 1942.  A. E. SCHUBERT  2,275,687
PHOTOGRAPHIC COPYING APPARATUS
Filed Aug. 16, 1940   2 Sheets-Sheet 2
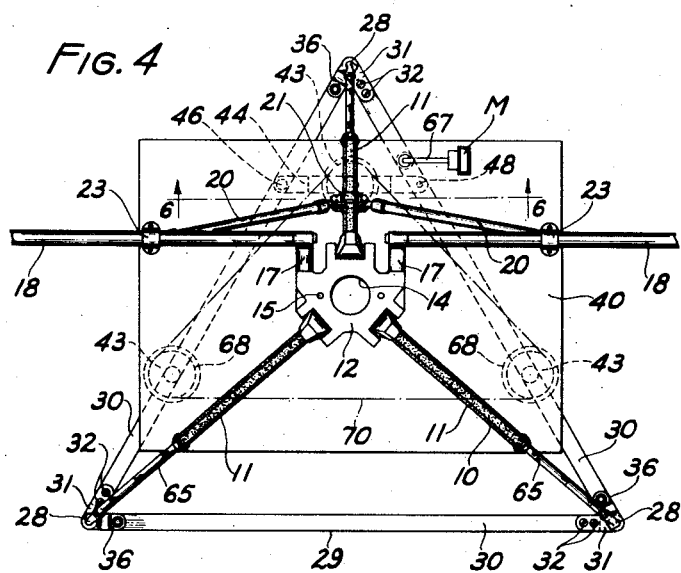
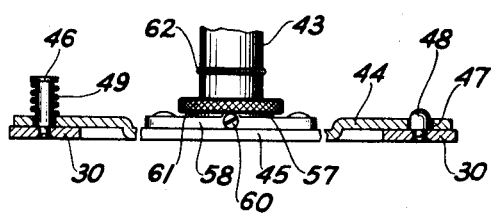
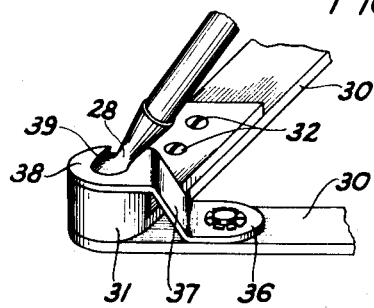
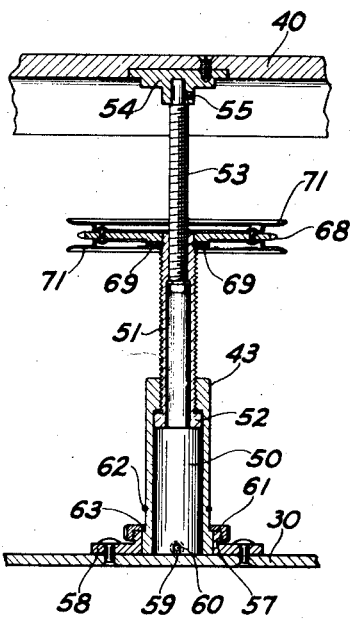
ALVIN E. SCHUBERT
INVENTOR
BY
ATTORNEYS Patented Mar. 10, 1942

2,275,687

UNITED STATES PATENT OFFICE 2,275,687

PHOTOGRAPHIC COPYING APPARATUS

Alvin E. Schubert, Rochester, N. Y., assignor to Eastman Kodak Company, Rochester, N. Y., a corporation of New Jersey Application August 16, 1940, Serial No. 352,896

10 Claims. (Cl. 88—24)

The present invention relates to photographic copying, or reproducing, apparatus, and particularly to a camera support and copy holder which are collapsible for the purpose of portability, and by means of which a correction in the focusing for varying thickness of copy can be readily achieved.

One object of the present invention is to provide a camera stand and copy holder for use in conjunction with a copying camera which is readily collapsible for the sake of portability.

Another object is to provide in combination with a camera stand having legs adjustable relative to one another, a collapsible support for the feet thereof by means of which the camera stand can be erected with the legs in a given fixed position of spread.

And another object is to provide a copy holder which can be detachably mounted on said support within the legs of the camera stand below the head of the stand and in alignment with the objective of a camera mounted on said head.

And still another object is to provide means whereby the copy holder can be adjusted to and from the head of the stand in accordance with the thickness of copy placed on the copy holder to insure the camera being in focus on the copy.

And yet another object is to provide means for easily adjusting said copy holder to and from the stand so that it will remain in a plane substantially parallel to the plane of the head throughout its adjustment.

And a further object is to provide three screw jacks for adjusting the copy holder to and from the head of the stand, and to operate them through sprockets by means of a common endless chain to insure the copy holder moving through parallel planes.

Another object is to provide a combined camera stand and support therefor of the type described wherewith the feet of the stand can be releasably locked to the stand to prevent the same from being accidentally shifted after once being set up.

Yet another object is to provide a combined camera stand and copy holder which can be broken down into several individual collapsible elements for the sake of portability, and which will provide an exceptionally rigid and efficient apparatus when set up.

Figure 2:
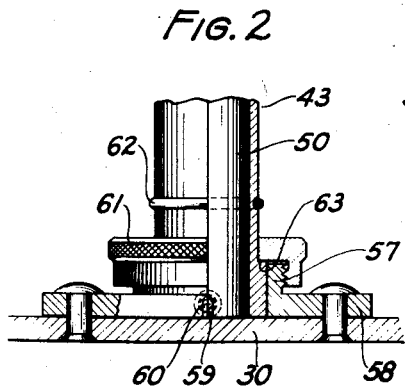
Figure 3:
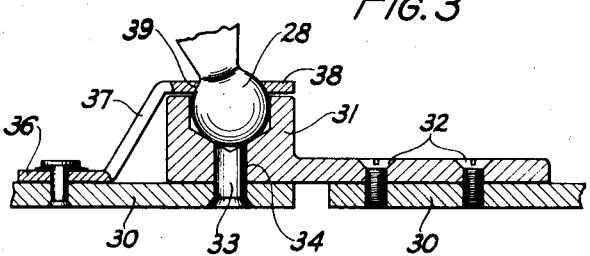

The novel features that I consider characteristic of my invention are set forth with particularity in the appended claims. The invention itself, however, both as to its organization and its methods of operation, together with additional objects and advantages thereof, will best be understood from the following description of a specific embodiment when read in connection with the accompanying drawings in which:

Fig. 1 is a side elevation of the combined camera support and copy holder constructed in accordance with a preferred embodiment of the invention, and showing the same set up in an operative position, Fig. 2 is an enlarged sectional detail showing the manner of attaching the screw jacks to the support for the camera stand, Fig. 3 is an enlarged sectional view of one corner of the support, and showing the manner of connecting the arms of the support together and releasably locking the feet of the stand to said support, Fig. 4 is a top plan view of the apparatus shown in Fig. 1, Fig. 5 is an enlarged sectional view of one of the screw jacks, and showing the manner of connecting the same to the copy holder and stand support, Fig. 6 is an enlarged sectional view taken substantially on line 6—6 of Fig. 4, and showing the manner of mounting a jack supporting arm across one vertex of the triangular tripod support to insure a proper support for the copy holder relative to the tripod legs and head, and Fig. 7 is an enlarged perspective view of one corner of the camera stand, and showing the manner of locking one foot of the camera stand to the support for the stand.

Like reference characters refer to corresponding parts throughout the drawings.

Referring now to the drawings, and particularly Figs. 1 and 4, the preferred embodiment of the present invention may comprise a camera stand in the form of a tripod, indicated generally as 10, and having three adjustable legs 11 pivoted at one end to a head 12 on which a camera 13 of any suitable form can be mounted. Looking at Fig. 4, it will be noticed that the tripod head 12 is provided with an opening 14 through which the camera lens is adapted to extend and be directed vertically downward when the camera is mounted on the head by any suitable means. As one suitable manner of attaching the camera to the tripod head, I have shown the head provided with two holes 15 on either side of opening 14 through which screws 16 may extend into tapped holes in the camera body. While I have chosen to show the camera stand as a tripod it is to be understood that any form of stand having a plurality of adjustable legs capable of being spread to and from one another could be used without going beyond the scope of the present invention.

Also pivoted to two extensions 17 on the tripod head 12 are a pair of lamp supporting arms 18 on the end of each of which may be pivotally mounted a lamp 19 for illuminating the copy. These lamp supporting arms are adapted to be held in an operative position by arms 20 pivoted at one end to a clamp 21 capable of adjustment along one of the tripod legs 11, and capable of detachable connection to the lamp supporting arms. The detachable connections between the lamp supporting arms and the arms 20 should be such as to permit of different angles of the arms 18 relative to the head 12. A connection which will suitably meet this requirement may comprise a socket 22 held to the arm 18 by a slidable clamp 23 and in which socket is positioned the ball end of a knurled internally threaded collar 24 which may engage a threaded end on the arm 20. For all copying work the position of the light relative to the copy usually remains fixed after once being properly adjusted so that there will be no occasion for very often shifting the clamps 23 and 21 along the light supporting arms 18 and leg 11, respectively, but the connection between the arms 20 and the sockets 22 has to be repeatedly broken to permit a collapse of the tripod and its associated parts. It will be appreciated that in a collapsed position of the stand the legs will fold into side-by-side relation and the lamp supporting arms 18 along with the arms 20 will pivot downwardly into side-by-side relation with said legs whereby the apparatus can be easily carried from place to place.

The tripod legs can be of any construction so that they can be adjusted as to length, whereby the tripod head can be adjusted to and from the copy holder for different degrees of reduction in the reproduction. As one example of a form of tripod leg which is suitable for this purpose reference is made to the tripod leg construction shown in U. S. Patent 2,019,753, issued November 5, 1935, in the name of Otto Wittel. The particular construction of the legs, exclusive of their feet, form no part of the present invention, but it is preferred that the legs terminate in ball-shaped feet 28 for the purpose hereinafter set forth.

The tripod is adapted to be rigidly supported in an erect position by a triangular support, indicated generally as 29, which is placed on the floor, or other foundation, and holds the tripod legs in a given position of spread. For the sake of portability this tripod support is composed of three individual bars 30 adapted to be connected in end to end relation by separable connecting means. Referring to Figs. 3, 4, and 7, to one end of each bar 30 is attached, as by screws 32, a socket 31 which is adapted to receive a ball-shaped foot of a tripod leg. The opposite end of the same bar includes a pin 33 which is adapted to extend into a hole 34 extending through the bottom of the socket on one of the other bars when the two are joined in endwise relation. To assemble the bars 30 into the rigid triangular support 29 it is only necessary to slip the pin 33 on one end of one bar into the hole 34 in the socket of another until the three bars have been connected in endwise relation as shown.

It is desirable that the tripod feet be releasably locked in the sockets of the triangular support so that accidental movement of the tripod relative to the support will be prevented. To this end each bar 30 has pivoted thereto, adjacent the pin 33 thereon, a latch 36, see Figs. 3 and 7. This latch is offset as shown at 37 so that the free end 38 thereof will be substantially in the plane of the top of the socket 31 on the adjoining bar. The latch includes a slot 39, extending from one edge thereof, and the width of this slot 39 is less than the diameter of the ball-shaped foot 28 of the tripod so as to confine the same within the socket. It will be noticed, by reference to Fig. 7, that the contour of the free end of the latch is substantially the same as that of the socket so that when the latch is in the locking position it appears as though the latch axially forms a part of the socket.

For positioning the copy below the tripod head in alignment with the camera lens the copy holder 40 is provided. This copy holder may be a plain rectangular board, or it may be the cover of a case in which the entire apparatus, exclusive of the camera equipment, may be packed for transportation from one place to another. In any case the copy holder is preferably a separate element from the tripod and support therefor for the purpose of portability, and is adapted to be detachably secured to the tripod support in picture-taking relation to a camera supported on the head of the tripod.

In the preferred embodiment of the invention the copy holder has attached to one side thereof an elevating and lowering means which serves also as means for attaching the holder to the tripod support. In the present instance this means comprises three screw jacks, indicated broadly as 43, spaced from one another so that when the copy holder is in proper position within the tripod legs two of the jacks can be attached to two of the arms 30 of the tripod support and the third will be supported by a short cross-arm 44 extending between two adjoining arms 30 across the angle between the two. Referring to Figs. 4 and 6, it will be noticed that this cross-arm 44 is pivoted at one end to a stud 46 extending from one arm 30 and at the other end is provided with an aperture 47 adapted to engage a round headed pin 48 on another arm 30. The cross-arm 44 will be pivoted to a position flush with the arm 30 on which it is pivoted when the support is collapsed. The pivoted end of the cross-arm is free to slide up and down the stud 46 so that the opposite end can be snapped onto, and off of, the pin 48, and is normally spring pressed downwardly by a compression spring 49 surrounding the stud. The cross-arm 44 has its center portion depressed as shown at 45 so that the bottom face thereof is in the plane of the bottom faces of the arms 30 whereby the cross-arm is supported on the floor, or other foundation, along with the rest of the support and is not called upon to support any weight.

Referring to Fig. 5, each screw jack 43 may comprise an open ended chamber 50 into the end of which an externally threaded tube 51 may be threaded, said last-mentioned tube having a flange 52 on the end thereof preventing the tube from being screwed out of the chamber. Into the end of the externally threaded tube 51 is threaded a screw 53 which is threaded oppositely to the external threads of tube 51. Thus when the tube 51 is rotated the same will move into or out of the chamber 50, depending upon the direction of rotation of the same, and at the same time the screw 53, since it cannot rotate, for reasons that will be apparent from the following description, will move into and out of the tube 51. One end of the screw 53 is fixedly attached to the copy holder by having the same held against rotation in a seat 54, fixed to the under side of the copy holder, by a setscrew 55. By virtue of this arrangement the screw jacks are rigidly connected to the copy holder to form an integral part thereof so far as the collapsing, or breaking down, of the apparatus is concerned.

For detachably mounting the copy holder to the tripod support in proper relation to the camera supported on the tripod the following structure is provided. Referring to Figs. 2 and 4, on each of two of the arms 30 and the cross-arm 44 of the triangular support is attached a flanged externally threaded sleeve 57 the flange 58 of which is fastened to the top of said arms by any suitable means. When the copy holder is properly positioned within the tripod legs the lower end of each of the chambers 50 of each of said jacks is adapted to slip into one of the sleeves 57 and an elongated slot 59 in the lower end of the chambers 50 is adapted to engage a screw 60 extending radially into said sleeve to properly locate the chambers relative to each other and said arms and to prevent the same from rotating. Slidably mounted on the lower end of the chamber 50 of each screw jack is an internally threaded coupling 61 which is adapted to threadedly engage the sleeve 57 to hold the jack to the arm on which it is positioned. Referring to Fig. 2, it will be noticed that the movement of a coupling along the chamber 50 is limited in one direction by a split spring ring 62 seated in a circumferential groove in the chamber, and in the other direction by a shoulder 63 on the chamber. It is against the last-mentioned shoulder that the coupling 61 draws when being tightened down, as will be appreciated from an inspection of Fig. 2. By virtue of this arrangement the elevating and lowering means of the copy holder, or screw jacks in this instance, act in the capacity of means for detachably mounting the copy holder to the support in addition to their normal function.

When the apparatus is set up, the size of reproduction and the focusing of the camera will be related to the plane of the copy holder as will now be described. The size of reproduction desired will be obtained by extending or retracting the legs of the tripod with the aid of indices 65 on each of the legs. These indices, as shown, may be four, eight, sixteen, etc. meaning of course one-quarter, one-eighth, or one-sixteenth, original size reproduction, and when the three legs are set at the same index the tripod head will be at the proper distance above the copy holder when adjusted to a given position, as will be set forth, to give the desired size of reproduction. The plane from which the size of reproduction is calculated is that determined by the plumb bob 66 supported from an L-shaped arm 67 detachably mounted on one of the bars 30 of the triangular support 29 and extending upwardly through a hole adjacent one edge of the copy holder, see Figs. 1 and 4.

The L-shaped arm 67 instead of extending upwardly through the copy holder, as shown, could be mounted outside of the boundary thereof and be rotatably mounted on the triangular support so that the plumb bob could be swung over the holder when properly positioning the copy on the same, and then be swung out of the way when photographing so that the whole area of the holder could be used. In the drawings, an exposure meter M is shown on the L-shaped arm 67 and from which the plumb bob is suspended, but it will be appreciated that the exposure meter may be omitted and the plumb bob extended directly from the arm.

When a copy consisting of a single sheet of paper is placed on the copy holder, the jacks 43 are raised until the copy just touches the plumb bob, then the copy is in the plane from which the indices on the tripod legs are calibrated. While the camera could be visually focused for each reproduction, to facilitate the use of the apparatus, the focusing ring of a camera is calibrated with indices corresponding to those on the tripod legs, or given sizes of reproduction, e. g. four, eight, sixteen, etc. With such an arrangement all that is necessary to focus the camera is to turn the focusing ring thereof to the size of reproduction desired, and corresponding to the setting of the tripod legs.

It will be appreciated that the copy holder must be raised and lowered in accordance with the thickness of the copy being reproduced, and it is for this purpose, rather than for focusing, that the screw jacks are provided. For example, if the first page of a book four inches thick is to be reproduced, then the copy holder must be lowered four inches to bring the page to be copied into the plane defined by the plumb bob 66. For the same reason, if the copy to be reproduced is two inches thick, then the jacks must be raised two inches from a position correct for a copy four inches thick, or lowered two inches from a position correct for a single sheet copy.

It will be readily understood that the copy holder must assume a plane substantially parallel to the plane of the tripod head throughout its range of adjustment. While this could be accomplished by the individual adjustment of each jack with the aid of a leveling mechanism, such as a bubble level, it is preferable to adjust the three jacks simultaneously so that the plane of the copy holder will remain in the proper relation to the tripod head throughout the adjustment thereof. To this end a toothed sprocket 68 is fixedly connected to the threaded tube 51 of each jack by means of set screws 69. Each of the three sprockets 68 is drivingly connected to each other by an endless chain 70 engaging the teeth of the three sprockets. Each sprocket includes flanges 71 extending beyond the ends of the teeth thereof to keep the chain from dropping off of the teeth, and the chain is of such a length that it has no tendency to drop off of the engaged teeth at any time. The three jacks are initially adjusted so that the heads thereof are in a single plane after which the chain is placed in engagement with the three sprockets and will simultaneously adjust the three jacks by the same amount thereafter so that the copy holder supported thereby will remain in a desired plane relative to the tripod head irrespective of its adjusted position. When the apparatus is collapsed and the copy holder is removed from the triangular support 29 by unscrewing the couplings 61 on the jacks, the jacks and the chain connecting the sprockets of the same remain connected to the copy holder and can be considered as integral parts thereof. The chain is so arranged that it can never become accidentally disconnected from the sprockets at any time so that the relative adjustment of the jacks never is accidentally altered.

From the above description it will be readily understood that the photographic copying, or reproducing, apparatus constituting the present invention, while designed for the sake of portability; provides a camera support which is very rigid and capable of rapid and immediate adjustment for different sizes of reproduction and in accordance with different thicknesses of copy. The camera tripod including the light supporting arms can be folded down so that each of the legs and arms lie in a group longitudinally of one another, and the triangular support can be broken down into three sections capable of a longitudinal arrangement for transportation. Each of these parts in a collapsed condition can be placed in a case which the copy holder can form the cover for. The elevating and lowering mechanism for the copy holder, while providing for the ready adjustment of the same in accordance with the different thickness of copy, also is so arranged as to lend itself to the collapsible nature of the entire apparatus.

While I have shown and described one specific embodiment of my invention, I am fully aware that many modifications thereof are possible. My invention, therefore, is not to be restricted except insofar as is necessitated by the scope of the appended claims.

Having thus described my invention, what I claim is new and desire to secure by Letters Patent of the United States is:

1. In an apparatus of the type described the combination with a collapsible camera stand having a plurality of adjustable legs pivoted to the head thereof to swing toward and away from one another, of a collapsible support for said stand, means on said support for receiving the feet of said stand to fix the legs thereof in a given position of spread, a copy holder, means for detachably mounting said copy holder on said support within the legs of said stand and beneath, and in a plane parallel to, the plane of said head, and an elevating mechanism for adjusting said copy holder to and from the head of said stand independently of said stand and in accordance with the thickness of copy positioned on said board.

2. In an apparatus of the type described the combination with a collapsible camera stand having a plurality of adjustable legs pivoted to the head thereof to swing toward and away from one another, of a collapsible support for said stand, means on said support for receiving the feet of said stand to fix the legs thereof in a given position of spread, means for releasably locking said feet in the receiving means on said support, a copy holder, means for detachably mounting said copy holder on said support within the legs of said stand and beneath, and in a plane substantially parallel to, the plane of said head, said last mentioned means including an elevating mechanism for adjusting said copy holder to and from the head of said stand in accordance with the thickness of copy positioned on said board.

3. In an apparatus of the type described the combination with a collapsible camera stand having a plurality of adjustable legs pivoted to the head thereof to swing toward and away from one another, and terminating in ball shaped feet, of a collapsible support for said stand, a plurality of sockets on said support for receiving the feet of said stand to fix the legs thereof in a given position of spread, means for releasably locking said feet in said sockets, a copy holder, means for detachably mounting said copy holder on said support within the legs of said stand and beneath, and in a plane substantially parallel to, the plane of said head; said last mentioned means including a plurality of spaced elevating means for adjusting said copy holder to and from the head of said stand in accordance with the thickness of copy positioned on said board.

4. In an apparatus of the type described the combination with a collapsible camera stand having a plurality of adjustable legs pivoted to the head thereof to swing toward and away from one another, and terminating in ball shaped feet, of a collapsible support for said stand, a plurality of sockets on said support for receiving the feet of said stand to fix the legs thereof in a given position of spread, means for releasably locking said feet in said sockets, a copy holder, means for detachably mounting said copy holder on said support within the legs of said stand and beneath, and in a plane substantially parallel to, the plane of said head, said last mentioned means including a plurality of spaced elevating means for adjusting said copy holder to and from the head of said stand in accordance with the thickness of copy positioned on said board, and means for adjusting each of said elevating means simultaneously so that the plane of said holder remains substantially parallel to the plane of the head throughout its range of adjustment.

5. In an apparatus of the type described the combination with a collapsible tripod stand the legs of which are pivoted to the tripod head to swing to and from one another, of a collapsible triangular support for said stand comprising three arms each detachably pivoted at one end to one end of the other two, means at each corner of said support for receiving the feet of said tripod to fix the legs thereof in a given position of spread, a copy holder, means for detachably mounting said copy holder on said support within said tripod legs and beneath, and in a plane substantially parallel to the plane of said head, and means for elevating and lowering said copy holder relative to the head of said stand in accordance with the thickness of copy positioned on said holder.

6. In an apparatus of the type described the combination with a collapsible tripod stand the legs of which are pivoted to the tripod head to swing to and from one another, of a collapsible triangular support for said stand comprising three arms each detachably pivoted at one end to one end of the other two, means at each corner of said support for receiving the feet of said tripod to fix the legs thereof in a given position of spread, a copy holder, means for detachably mounting said copy holder on said support within said tripod legs and beneath, and in a plane substantially parallel to, the plane of said head, said last mentioned means including a plurality of adjusting means for elevating and lowering said copy holder relative to the head in accordance with the thickness of copy positioned on said holder, and means for simultaneously adjusting each of said adjusting means in a like manner whereby the plane of the copy holder in any position of adjustment remains substantially paralel to the plane of the head of the tripod.

7. In an apparatus of the type described the combination with a collapsible tripod stand the legs of which are pivoted to the tripod head to swing to and from one another, of a collapsible triangular support for said stand comprising three arms each detachably pivoted at one end to one end of the other two, means at each corner of said support for receiving the feet of said tripod to fix the legs thereof in a given position of spread, a copy holder, means for detachably mounting said copy holder on said support within said tripod legs and beneath, and in a plane substantially parallel to the plane of said head, said last mentioned means including a plurality of screw jacks in spaced relation for elevating and lowering said copy holder relative to the tripod head in accordance with the thickness of copy positioned on said holder, and means for simultaneously adjusting each of said jacks whereby the plane of the copy holder in any position of adjustment remains substantially parallel to the plane of the tripod head.

8. In an apparatus of the type described the combination with a collapsible tripod stand the legs of which are pivoted to the tripod head to swing to and from one another, of a collapsible triangular support for said stand comprising three arms each detachably pivoted at one end to one end of the other two, means at each corner of said support for receiving the feet of said tripod to fix the legs thereof in a given position of spread, a copy holder, three screw jacks connected at one end in spaced relation to one side of the copy holder and adapted to be detachably connected to said support for mounting said copy holder on said support for adjustment relative to said tripod head in accordance with the thickness of copy positioned on said holder, and means for adjusting said three screw jacks simultaneously.

9. In an apparatus of the type described the combination with a collapsible tripod stand the legs of which are pivoted to the tripod head to swing to and from one another, of a collapsible triangular support for said stand comprising three arms each detachably pivoted at one end of the other two, means at each corner of said support for receiving the feet of said tripod to fix the legs thereof in a given position of spread, a copy holder, means for detachably mounting said copy holder on said support within said tripod legs and beneath, and in a plane substantially parallel to the plane of said head, said last mentioned means including three screw jacks adapted to be detachably connected to said support in spaced relation and to adjustably support said copy holder, a sprocket connected to a rotatable adjusting part of each of said jacks for adjusting the same upon rotation, and an endless chain passing around each of said sprockets in driving engagement therewith for simultaneously adjusting the three jacks.

10. In an apparatus of the type described the combination with a collapsible tripod the legs of which are pivoted to the tripod head to swing to and from one another and which terminate in ball-shaped feet, of a collapsible triangular support for said stand comprising three arms each detachably pivoted at one end to one end of the other two, a socket at each corner of said support for receiving the feet of said tripod to fix the legs thereof in a given position of spread, means on said support for releasably locking said feet in said sockets, a copy holder, means for detachably mounting said copy holder on said support within said tripod legs and beneath, and in a plane substantially parallel to, the plane of said head, said last mentioned means including three screw jacks adapted to be detachably connected to said support in triangular spaced relation and to adjustably support said copy holder, a sprocket connected to a rotatable adjusting part of each of said jacks for adjusting the same upon rotation, and an endless chain passing around each of said sprockets in driving engagement therewith for simultaneously adjusting the three jacks.

ALVIN E. SCHUBERT.